No. 614,529. Patented Nov. 22, 1898.
J. W. BONTA.
PROCESS OF AND APPARATUS FOR ANNEALING GLASS PIPE.
(Application filed Nov. 11, 1897.)
(No Model.) 2 Sheets—Sheet 1.
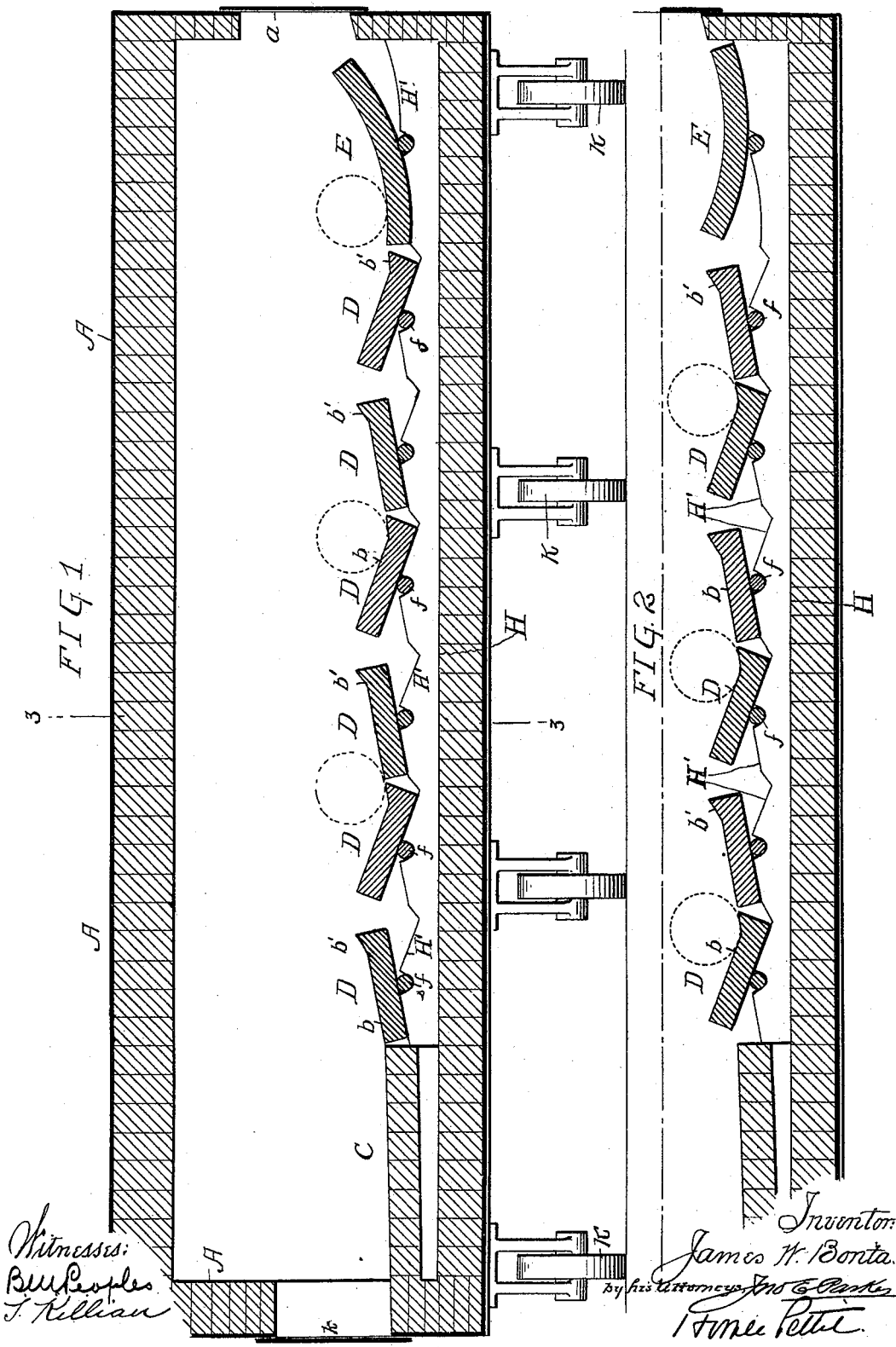

No. 614,529. Patented Nov. 22, 1898.
J. W. BONTA.
PROCESS OF AND APPARATUS FOR ANNEALING GLASS PIPE.
(Application filed Nov. 11, 1897.)
(No Model.) 2 Sheets—Sheet 2.
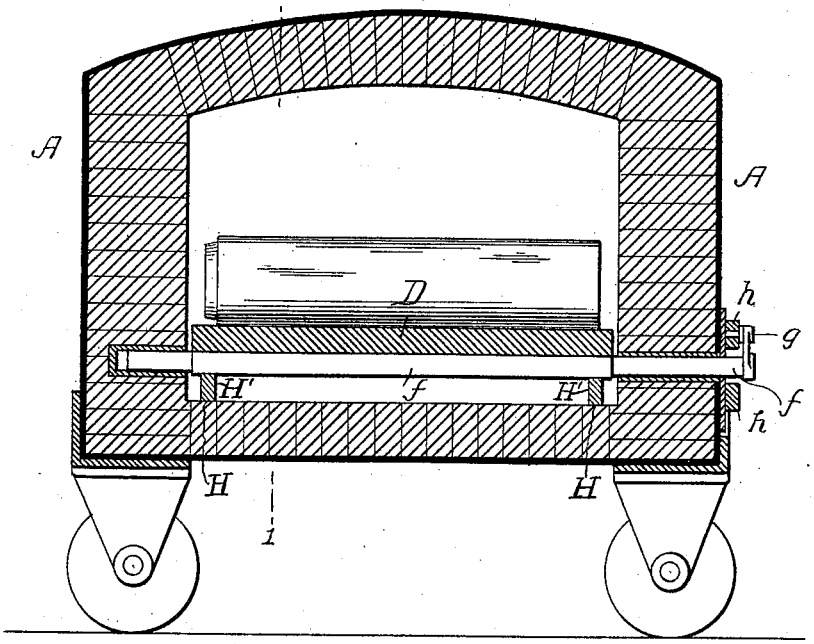
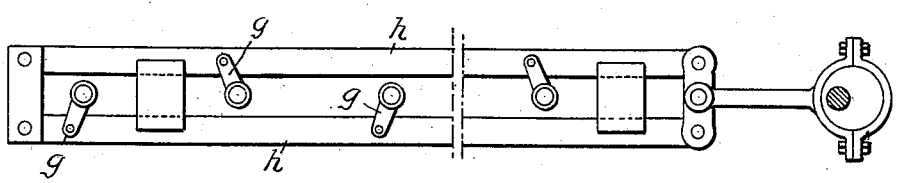
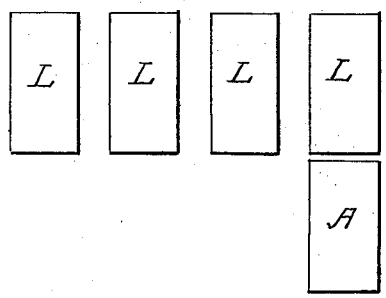

UNITED STATES PATENT OFFICE.

JAMES W. BONTA, OF WAYNE, PENNSYLVANIA, ASSIGNOR TO THE BONTA GLASS PIPE AND CONDUIT COMPANY, OF SCRANTON, PENNSYLVANIA.

PROCESS OF AND APPARATUS FOR ANNEALING GLASS PIPE.

SPECIFICATION forming part of Letters Patent No. 614,529, dated November 22, 1898.

Application filed November 11, 1897. Serial No. 658,141. (No model.)

*To all whom it may concern:*

Be it known that I, JAMES W. BONTA, a citizen of the United States, and a resident of Wayne, Delaware county, State of Pennsylvania, have invented a certain new and Improved Process of and Apparatus for Annealing Glass Pipe, of which the following is a full, clear, and exact description, reference being had to the accompanying drawings, forming part of this specification.

My invention relates to certain improvements in the manufacture of pipes and other tubular and cylindrical articles of glass, and has for its object to provide for the retaining of the pipe or other article in proper form and shape while in the annealing-oven, as more fully set forth hereinafter.

In the manufacture of pipes and other cylindrical tubular articles of glass, whether by casting or otherwise, a thin skin or film is formed on the surfaces of the glass exposed to contact with metallic or other surfaces or to the action of the air before the inner portions of the glass are set, and this film or skin will give to the pipe a rigidity sufficient to permit of its removal from the point of manufacture to the annealing-oven; but when in the annealing-oven and subjected to the high temperature the skin will soften to such an extent as to lose its strength and rigidity and permit the still plastic glass to sag and bend if the article be permitted to remain standing in the same position for any length of time. To prevent this sagging and distortion of the form and shape of the article being annealed is the object of my present invention, and to this end the article while in the annealing-oven and during the preliminary stages of the annealing operation is kept in constant motion, so that the bearing-surface in contact with the floor of the oven will be constantly changing and the weight of the glass will be borne at different points in the circumference of the pipe and its sagging prevented.

A further object of the invention is to provide for the storage of the partly-annealed pipes in ovens when the final operation is carried on and the employment of a single preliminary oven in connection with a series of storage-ovens.

In the accompanying drawings, Figure 1 is a longitudinal sectional elevation on the line 1 1, Fig. 3, of an annealing-oven constructed in accordance with my invention and adapted to carry my improved process into effect. Fig. 2 is a similar view of a portion of the same, illustrating some of the parts in different positions. Fig. 3 is a transverse sectional elevation of the annealing-oven on the line 3 3, Fig. 1. Fig. 4 is a side elevation of a portion of the oven, illustrating the mechanical connections between the various rocking platens which form the forward portion of the oven-floor; and Fig. 5 is a diagram representing a single movable preliminary oven and a series of storage-ovens.

Referring to the drawings, A represents the walls of an annealing-oven provided with any suitable arrangement of entrance and exit flues for the products of combustion employed in the heating operation, and $a$ represents the door through which the pipes to be annealed are introduced into the oven. The rear portion C of the oven-floor is stationary and where the oven is fixed is of suitable dimensions to receive and support a comparatively large number of the pipes to be annealed, while the forward portion of the floor is formed of a series of rocking platens D, there being between the forward platen and the entrance-door $a$ a rocking table E, on which the pipes are first received and from thence discharged to the series of platens.

Each platen D has, except at the forward edge, a substantially flat upper surface $b$, the upper edge having a slightly-inclined surface $b'$ arranged at a suitable angle to receive from the next adjoining platen the pipe to be annealed and to hold and carry the same until in the rocking of the platen the pipe is rolled from thence over the flat surface to the inclined surface $b'$ of the next platen in the series.

Secured to the under central portion of each platen is a rock-shaft $f$, which extends out through the wall of the oven and is there connected by a rod or link $g$ to one or other of two parallel bars $h$, which are reciprocated by hand or by suitable mechanism and effect, through the links $g$ and rock-shafts $f$, a rocking movement of the various platens in the series. The connections are such that each alternate platen will simultaneously assume the same position and adjacent platens will operate in pairs, one discharging and its fellow receiving the article to be annealed. The inclined positions which the platens assume in rocking to and fro are determined by inclined shoulders H', which are supported on ledges H at one or both sides of the oven.

The table E at the extreme front of the oven may be slightly concaved, as illustrated, and on this table the pipe is placed preliminary to its transit to the rear of the oven, the central rock-shaft of said table extending through the wall of the furnace and being provided with an operating-lever or other device to effect the rocking of the table.

In operation the previously-formed pipe is placed on the table E, and the latter is rocked to and fro for a short time to constantly change the surface of the pipe in contact with the table, and this operation is kept up until the plastic glass has partially or wholly "set" or has assumed a sufficient degree of firmness and rigidity to enable it to remain in one position without sinking or distortion, after which it may be discharged into the first of the platens D. The rocking of the platens changes the position of the first platen to the angle shown in Fig. 2, and the glass pipe is discharged from this first platen to the second platen and in a similar manner to the third platen, and so on throughout the series, until finally the pipe is discharged on the rear portion of the floor of the oven.

At the rear of the annealing-oven, if the latter is stationary, the storage-floor is large enough to receive and hold quite a large number of pipes until the completion of the annealing operation; but as the preliminary rolling operation takes but a comparatively short time I prefer to mount the oven on rollers or carrying-wheels K and to place at the rear of such oven a discharge-door $k$, as shown. In connection with this preliminary rolling oven I employ any number of storage-ovens D, as shown in the diagram of Fig. 5, into which the partly-annealed pipes roll from the preliminary oven until all are filled, the process of annealing being completed in the storage-ovens.

The use of a preliminary table, such as E, is only necessary when but a small number of platens D is employed, and the table may be altogether dispensed with if the number of platens be sufficient to give the pipe time to set before it finally reaches the discharge-opening $k$ or the storage-surface at the rear of the oven. Again, the platens may be dispensed with and the rocking table E be of a length sufficient to receive the pipe at the front of the oven and to discharge the same at the rear of the oven, the table being rocked to and fro and the pipe kept in constant motion until it is discharged therefrom through the door $k$ or onto the surface C, although such a single rocking floor to some extent reduces the capacity of the oven in that the floor cannot receive as many pipes in the same length of time as where, in the apparatus shown in Figs. 1 and 2, a smaller rocking table is employed for the preliminary stages of the setting and the setting is completed during the travel of the pipe across the series of rocking platens. It is also within the scope of the process to effect the turning of the pipe by manual labor, as by the introduction of a rod or lever through an opening into the furnace, as will be readily understood.

Having thus described my invention, what I claim, and desire to secure by Letters Patent, is—

1. The herein-described process of annealing pipe and other tubular articles of glass, said process consisting in introducing the article into an annealing-oven and subjecting it therein to the action of heat, turning or rolling said article until it has assumed sufficient firmness or rigidity to retain its shape and form and continuing the annealing operation with the article in a stationary position, substantially as specified.

2. In an annealing-oven a supporting-floor consisting of a longitudinal series of sections for supporting glass pipe in the plastic or semiplastic condition, the sections of the said floor constructed and arranged to operate on axes transverse to the furnace, thereby constantly changing the point of the supporting-surface and mechanically operated to impart rotary or rolling motion to said pipe in the process of annealing, and mechanism for operating said floor-sections.

3. The combination in an oven for annealing cylindrical articles of the floor comprising a series of rocking platens adapted to receive and convey the article to be annealed from the front to the rear of the oven and means for simultaneously rocking alternate platens in the same direction.

4. In a floor for an annealing-oven comprising a series of transversely-arranged rocking platens, rock-shafts carrying said platens and mechanism for partly rotating said shafts alternately in opposite directions, substantially as specified.

5. The combination in an annealing-oven of the stationary floor, C, a receiving-platform, E, at the front of the oven, a series of rocking platens adapted to roll and convey the article to be annealed from the front to the rear of the oven, and mechanism for rocking said platform and platens, substantially as specified.

6. The combination with a series of storage-ovens, of a preliminary annealing-oven, a series of platens in said preliminary oven for conveying the article to be annealed through said oven, means for rocking alternate platens simultaneously in the same direction and supporting-wheels under said preliminary oven, substantially as specified.

In witness whereof I have hereunto set my hand this 11th day of October, A. D. 1897.

JAMES W. BONTA.

Witnesses:
JNO. E. PARKER,
J. HENDERSON.